United States Patent
Rose

(10) Patent No.: US 9,817,777 B2
(45) Date of Patent: Nov. 14, 2017

(54) MULTI-OPERATING STATE SERIAL ATA DEVICES AND METHODS OF OPERATION THEREFOR

(71) Applicant: OCZ Storage Solutions Inc., San Jose, CA (US)

(72) Inventor: Philip David Rose, Islip (GB)

(73) Assignee: Toshiba Memory Corporation, Tokyo (JP)

(*) Notice: Subject to any disclaimer, the term of this patent is extended or adjusted under 35 U.S.C. 154(b) by 225 days.

(21) Appl. No.: 14/674,721

(22) Filed: Mar. 31, 2015

(65) Prior Publication Data
US 2016/0292103 A1    Oct. 6, 2016

(51) Int. Cl.
| G06F 3/00 | (2006.01) |
| G06F 13/362 | (2006.01) |
| G06F 13/40 | (2006.01) |
| G06F 13/42 | (2006.01) |

(52) U.S. Cl.
CPC ........ G06F 13/362 (2013.01); G06F 13/4068 (2013.01); G06F 13/4282 (2013.01)

(58) Field of Classification Search
None
See application file for complete search history.

(56) References Cited

U.S. PATENT DOCUMENTS

| 7,827,320 | B1 | 11/2010 | Stevens | |
| 8,140,712 | B2* | 3/2012 | Stenfort | G06F 13/28 710/5 |
| 8,423,680 | B2* | 4/2013 | Stenfort | G06F 13/28 710/22 |
| 8,615,609 | B2* | 12/2013 | Stenfort | G06F 13/28 710/22 |
| 8,972,614 | B2* | 3/2015 | Peled | G06F 13/1689 710/5 |
| 9,330,033 | B2* | 5/2016 | Stenfort | G06F 13/28 |

* cited by examiner

*Primary Examiner* — Idriss N Alrobaye
*Assistant Examiner* — Richard B Franklin
(74) *Attorney, Agent, or Firm* — White & Case LLP

(57) ABSTRACT

Methods and SATA devices having more than one operating state suitable for providing efficient command and data transfers over a SATA bus. A SATA device is provided for communicating with a host. The host sends commands to the SATA device and the SATA device sends data to the host in response to the commands being received by the SATA device. The SATA device has a queue of commands received from the host. The SATA device is configured to operate in a first operating state wherein the commands are received by the SATA device and the data are not sent to the host, and a second operating state wherein the commands are received by the SATA device and the data are sent to the host wherein data being sent to the host has priority over receiving commands by the SATA device.

20 Claims, 5 Drawing Sheets

Bus activity - Commands and data transfer
batched interleaving of commands and data Bus activity - Commands and data transfer with intra-command processing Bus activity - Commands and data transfer
batched interleaving of commands and data

MULTI-OPERATING STATE SERIAL ATA DEVICES AND METHODS OF OPERATION THEREFOR

BACKGROUND OF THE INVENTION

The present invention generally relates to mass storage devices. More particularly, this invention relates to methods and Serial Advanced Technology Attachment (SATA) devices suitable for improving the efficiency of communication over a SATA bus.

SATA devices, such as hard disk drives (HDDs) and nonvolatile solid-state drives (SSDs), communicate with a host using the SATA protocol. To implement a large read command, the SATA device typically transmits the requested data to the host in multiple blocks (e.g., 8 k blocks).

FIG. 1 represents a situation that occurs when both the host and the SATA device are attempting to communicate with each other at the same time. In 100, both send the other X_RDY primitives to initiate a command or data transfer, respectively. The SATA protocol states that the host must back down in the event of a collision between X_RDY primitives (i.e., when both links wish to transmit an FIS (Frame Information Structure) simultaneously). Typically for SATA NCQ (Native Command Queuing) protocol, this is a collision between the host wanting to send a new command and the device wanting to send a DMA Setup FIS to start the data phase of a previously received command.

In 120, the host must back down when it detects that it has received an X_RDY primitive from the SATA device and therefore aborts a command that was about to be sent. In 130, the host completes the abort and responds to the incoming X_RDY primitive with an R_RDY primitive. The SATA device may then proceed to complete the data transfer.

As operating speeds of SATA devices have improved, it has been determined that this process results in a situation where, if the SATA device is too fast, it will tend to repeatedly win the above collision causing the SATA device to starve itself of commands received from its host. This will result (in the case of read commands) in a period in which the SATA bus is underutilized as once all the data phases are complete, there are no commands being processed in the SATA device, so no data may be transferred for at least a period of time equal to the read access latency of the SATA device.

To explain this situation in more detail, FIG. 2 represents how the bus activity proceeds with time where the host is continuously sending a stream of commands to read data. The host begins to send the commands at 200 and continues to send commands until it has completed a burst of commands, or the SATA NCQ limit (32 in the present version) is complete 210. The SATA device takes time to respond to the first command with a read latency 220. This time period will generally be much longer than a time taken to issue all the commands to fill the command queue of the SATA device. Therefore, this process gives rise to a time period where the bus is inactive 240, where the host is waiting for the SATA device to respond with data, and the SATA device has yet to fetch the data for the first command received.

At 230, the SATA device begins to return data to the host. The SATA device will continue to return data for as long as it has fetched data for commands that are outstanding. As the host begins to receive data for outstanding commands (data is acknowledged using a tag which identifies the command that was used to read the data), the host is aware that the SATA device's queue is no longer full and has spare slots in its queue. However, while the SATA device is transferring data, the host is unable to send commands to the SATA device due to the SATA protocol collisions discussed in FIG. 1. For example, at 250, the host attempts to send more commands but is unable to do so and has to abort each attempt. At 260, the SATA device ceases to return data as all data for the read commands in the queue has been fetched. By 260, the SATA device has no more outstanding commands in its queue and has finished transferring data. The host is now no longer forced to back down on its attempts to send commands and proceeds to send commands to re-fill the command queue of the SATA device. The SATA device will again suffer a latency before the data for the first of this batch of new commands is available for transfer back to the host.

In this way, the continuous sending of commands to the SATA device and transfer of data back to the host proceeds in a repeated cycle identical to the first cycle 280. This is inefficient as there is a period of bus inactivity for each cycle. By way of example, for a SATA bus operating at 6 Gbps, a command may be sent to the SATA device in about 2 µs (microseconds). The SATA device then takes about 1 µs to set up a DMA transfer, with the transfer itself (for 4 KB of data) taking about 7 µs. Each 4 KB transfer therefore takes a total of about 10 µs, making it theoretically possibly to support 100 K transfers per second (referred to in disk drive specifications as Input/Output Operations Per Second or IOPS). This assumes that the commands and transfers all occur back to back, with no gaps in between leading to inactivity on the bus.

However, with the scenario represented in FIG. 2, the time taken for the host to send 32 commands is about 64 µs. With hard disk drives the read command latency is measured in milliseconds, with a solid state drive this latency may be down to 70 µs. In solid state drives, this still gives rise to a bus inactivity period of about 6 µs (i.e., 70−64=6). This period of inactivity is repeated on each cycle, even where the host is continually sending commands and can do this faster than the SATA device can send data back. Therefore, for an ideal back-to-back command and data transfer cycle, it would take about 320 µs, but the SATA protocol behavior introduces this bus inactivity period which, even if it is as low as 6 µs for an SSD, it can still represent a performance degradation of a few percent.

Prior attempts to address this issue include adding a relatively small programmable delay between each block transfer to allow the host to send intra-command data to the SATA device. However, inserting a delay between each block transfer limits the maximum IOPS of the device and can significantly degrade the performance (throughput) of the SATA device.

Alternatively, U.S. Pat. No. 7,827,320 to Stevens discloses a method whereby when a SATA device is in the X_RDY (XRDY) state and receives a X_RDY primitive from the host, the SATA device sets a RX_RDY (RXRDY) tag to identify the collision. Then after the SATA device sends the next FIS to the host (in response to the R_RDY (RRDY) primitive), when the SATA device enters the IDLE state it checks whether the RX_RDY tag was set. If so, the SATA device enters a secondary idle state, clears the RX_RDY tag, and waits for the host to transmit another X_RDY primitive. If the SATA device receives a X_RDY primitive while in the secondary idle state, the SATA device transitions into a receive FIS state and receives and processes a FIS from the host containing intra-command data (e.g., a free fall event detected). If the host does not transmit an X_RDY to the SATA device, the SATA device transitions into the X_RDY state in order to continue processing the current read command.

As best understood, FIG. 3 represents a bus timing diagram in accordance with an embodiment as disclosed in Stevens. As represented in FIG. 3, when the host attempts to send a command while the device is transferring data 250, the device notes this fact, completes the current FIS transfer, and then waits 255. This leads to a period of bus inactivity 257. When the host completes its back down and aborts the command, it retries at 258 and may be successful (assuming the device has waited long enough). A command is then sent and then the device resumes its data transfers 235. When the host tries to send the next command 275, the process repeats with another period of bus inactivity 276, the command sent 277, and data transfers resuming 278. This cycle will repeat again as represented at 285, 286, 287, 288, and for as long as the host has commands to send.

Therefore, systems of this type still suffer an initial bus inactivity 240, but then proceed to a shorter cycle where, for each further command sent, there is a short period of inactivity, 257, 276, 286, etc., while the device waits for the host to complete its back down and command abort before re-trying the command. This introduces a bus delay for every command that is sent. While the delay per command may be less than the delay per command for the prior art represented in FIG. 2 (delay 240 divided by the maximum number of commands stored in the SATA device, generally 32), the bus utilization is still less than optimal and the IOPS performance figure is reduced.

In view of the above, it can be appreciated that there is an ongoing desire for improved methods and devices capable of providing efficient command and data transfers in the SATA protocol.

BRIEF DESCRIPTION OF THE INVENTION

The present invention provides methods and SATA devices having more than one operating state suitable for providing efficient command and data transfers over a SATA bus.

According to one aspect of the invention, a SATA device is provided for communicating with a host. The host sends commands to the SATA device and the SATA device sends data to the host in response to the commands being received by the SATA device. The SATA device has a queue of commands received from the host. Only one of either the commands from the host or the data from the SATA device is sent at a time. The SATA device is configured to operate in a first operating state wherein the commands are received by the SATA device and the data are not sent to the host, and a second operating state wherein the commands are received by the SATA device and the data are sent to the host, wherein data being sent by the SATA device to the host has priority over commands being received by the SATA device from the host.

According to another aspect of the invention, a method of managing communication between a host and a SATA device includes sending commands from the host to the SATA device while the SATA device is operating in a first operating state. The commands received by the SATA device are stored in a queue in the SATA device. The method further includes transitioning the SATA device from the first operating state to a second operating state. While in the second operating state, data are sent from the SATA device to the host in response to the commands stored in the queue, and, if the SATA device does not have commands in the queue to which the SATA device is prepared to respond or the SATA device is otherwise busy, commands are sent from the host to the SATA device. The data are not sent from the SATA device to the host while the SATA device is operating in the first operating state.

A technical effect of the invention is that due to the dual operating state configuration, the SATA device will preferably always have a minimum number of commands in its queue. As such, it is believed that time gaps between the sending of a command from the host to the SATA device and the SATA device responding to a command will be minimized and/or eliminated allowing the SATA device to operate at improved efficiencies relative to conventional devices operating according to the SATA protocol.

Other aspects and advantages of this invention will be better appreciated from the following detailed description.

DETAILED DESCRIPTION OF THE INVENTION

Figure 1:
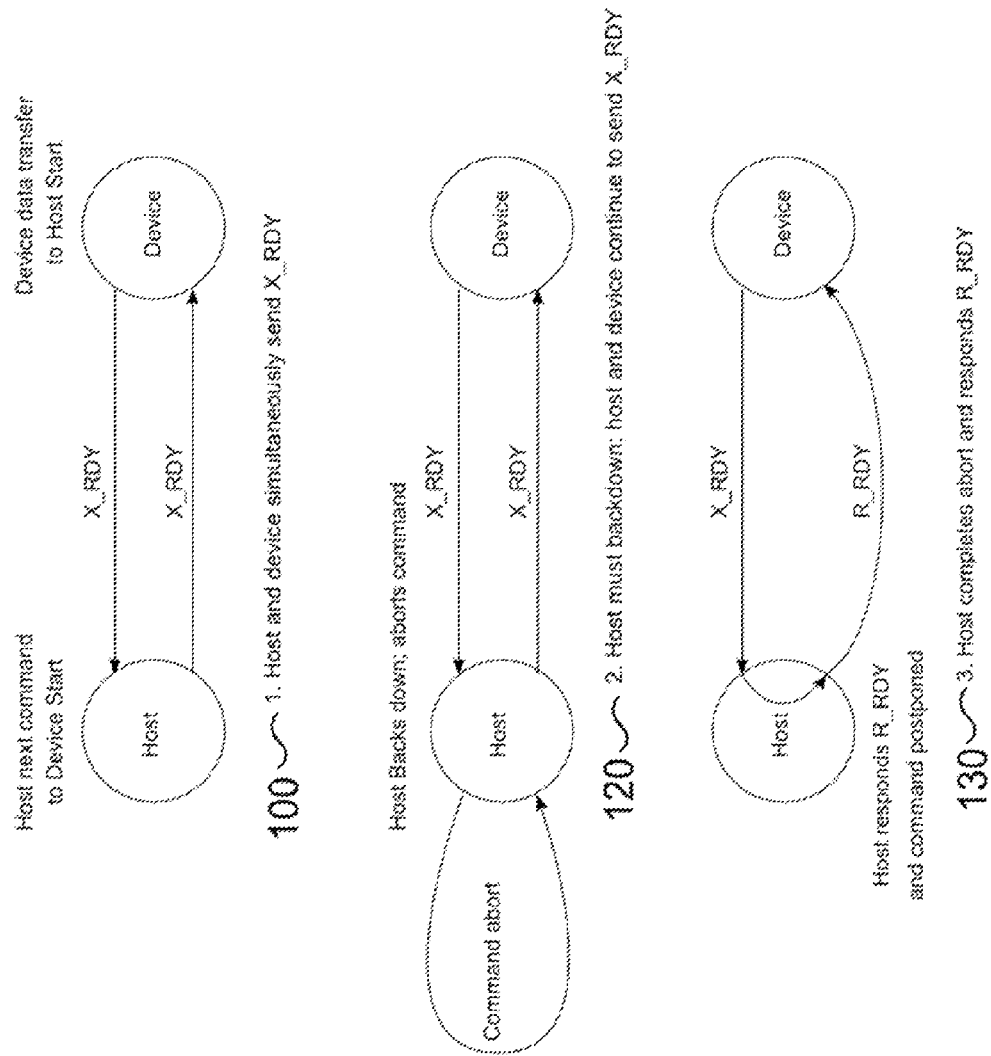
FIG. 1 represents communication between a host and a SATA device under SATA protocol.
Figure 2:
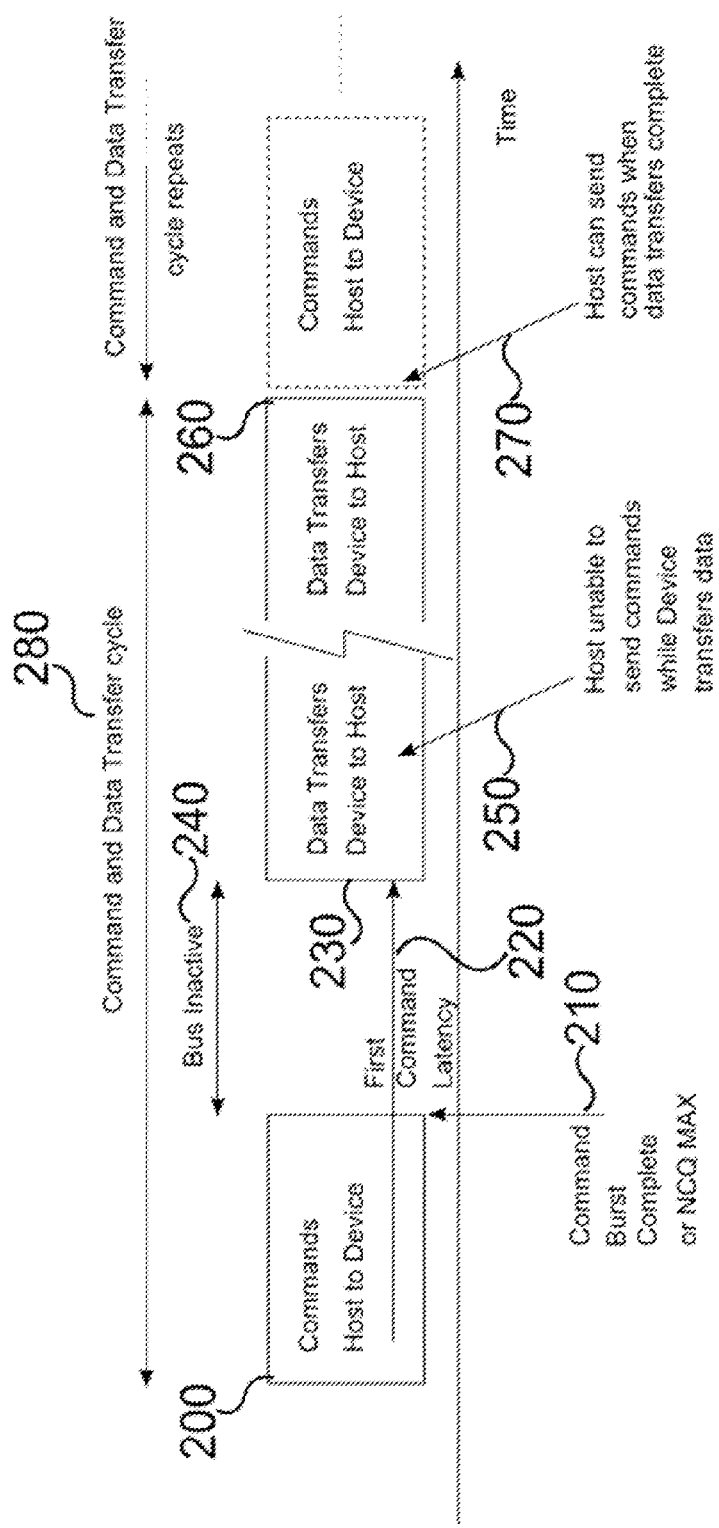
FIG. 2 represents communication over a SATA bus over time between a host and a SATA device illustrating large time gaps inherent to the SATA protocol for high speed SATA devices.

The present invention provides methods and SATA devices, such as HDDs and SSDs, configured to provide a multi-operating state solution to the issues discussed in reference to FIG. 1. The SATA devices described herein are configured to switch between at least a first operating state, referred to herein as a command receive state, where data are not transferred from the SATA device to a host, and at least a second operating state, referred to herein as a data state, where data phases are completed back-to-back without delay. It is also foreseeable that the methods disclosed herein may be applicable to devices having additional operating states and/or operating on protocols other than SATA.

According to one aspect of the invention, a SATA device may begin operations in a command receive state. While in this operating state, commands are received but no data phases are started, that is, no data are sent to a host from the SATA device in response to receiving the commands. The SATA device will preferably continue to operate in this state until either the number of commands in the system is greater than the maximum command threshold, a programmable command timeout is reached, or some other threshold is reached, at which point the SATA device will transition to a data state. In the data state, the data phases of commands are completed without delay. Thus, if the SATA device has commands where a data phase is able to start, the device will always win the X_RDY collision and the data phase will occur. If the device is busy for some other reason, commands will be received as normal. The SATA device will preferably exit the data state and return to the command receive state when a number of outstanding commands in the system falls below a minimum command threshold. This minimum threshold may be optimized such that enough commands are still outstanding in the queue to keep the SATA bus busy for a period of time at least equal to the read access latency of the SATA device. Once the number of outstanding commands in the system falls below the minimum command threshold, a combined status is emitted and the SATA device transitions back to the command receive state. As such, the number of SATA NCQ commands in the SATA device preferably varies between the minimum and maximum command thresholds in a hysteretic manner.

Figure 4:
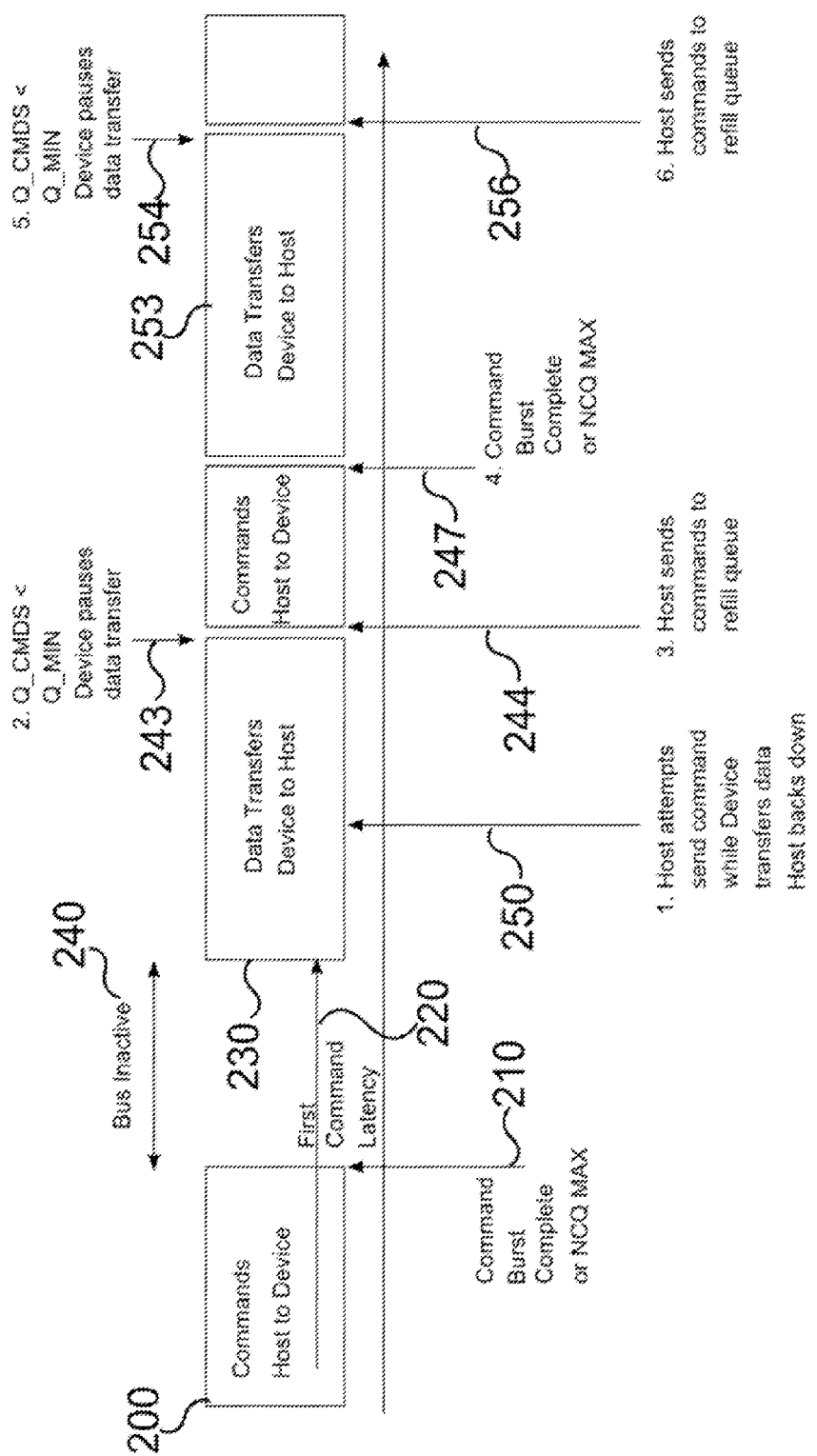
FIG. 4 represents communication over a SATA bus over time between a host and a SATA device in accordance with aspects of the present invention.

FIG. 4 represents bus activity diagram according to an aspect of the invention. Here, the initial phase 200-250 is conventional, except that at 243, the device pauses its data transfers when it has processed a number of commands such that the number of commands remaining in the queue, Q_CMDS, is less than a minimum threshold, Q_MIN. Now, the host can start to send commands 244 uninterrupted, until again it has completed its burst or the queue is full (Q_CMDS is equal to Q_MAX) 247. At this point the device can resume data transfers as there were commands still outstanding when it started to receive new commands at 244. Therefore, the device has data available to transfer immediately when the command burst completes at 247. The data transfers proceed back-to-back 253 until again the queue is depleted to the point where Q_CMDS is less than Q_MIN. Now the cycle repeats again 256, identical to the sequence 244 to 254.

Figure 3:
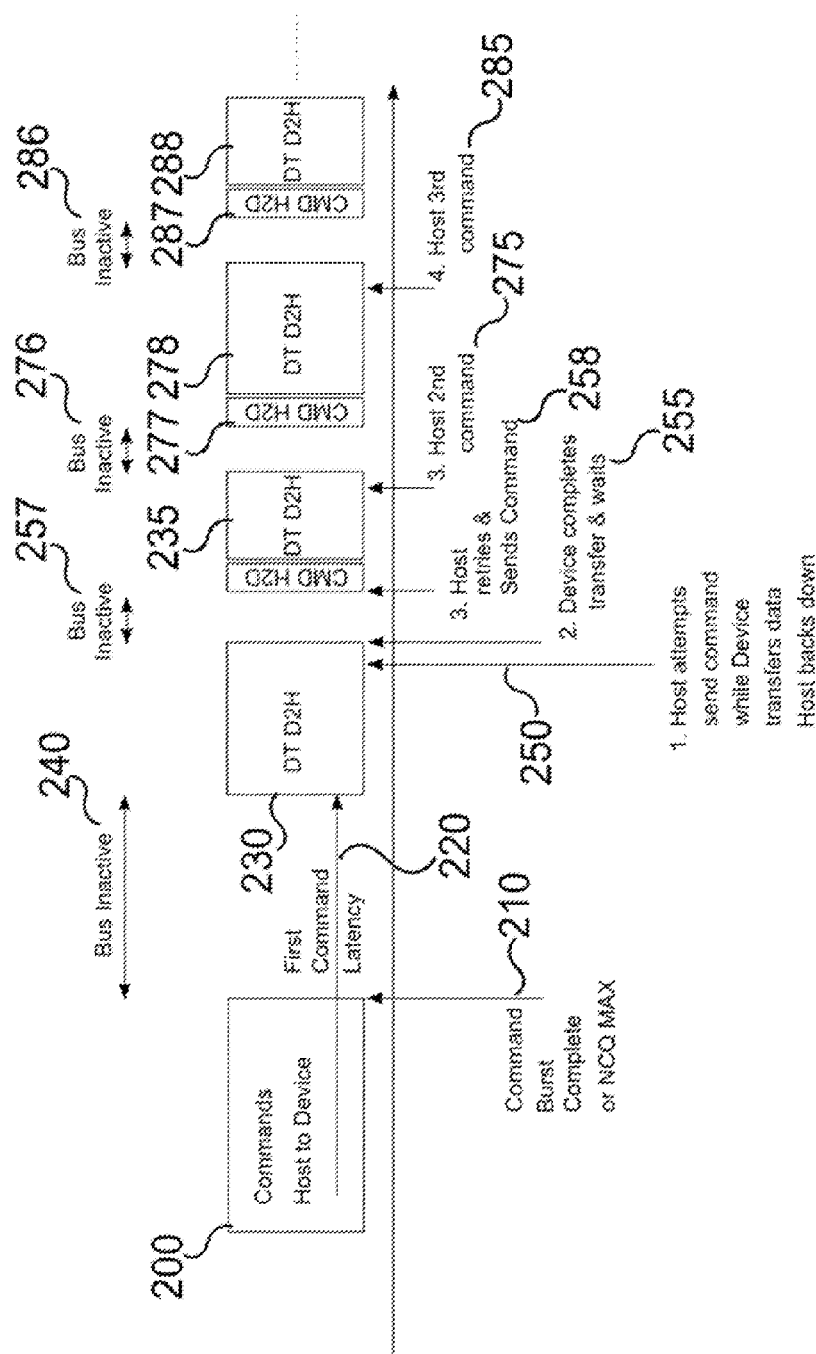
FIG. 3 represents communication over a SATA bus over time between a host and a SATA device of a type configured to at least partially address the time gaps illustrated in FIG. 2.

In this situation, groups of commands are sent back-to-back at 244, data transfers proceed back-to-back at 253, with only short gaps therebetween while the commands stop and data transfers proceed and vice versa. This method is believed to produce a more efficient bus utilization than prior art methods of the type illustrated in FIG. 3 where there was a delay for each and every command sent and for each and every data transfer resumed.

Figure 5:
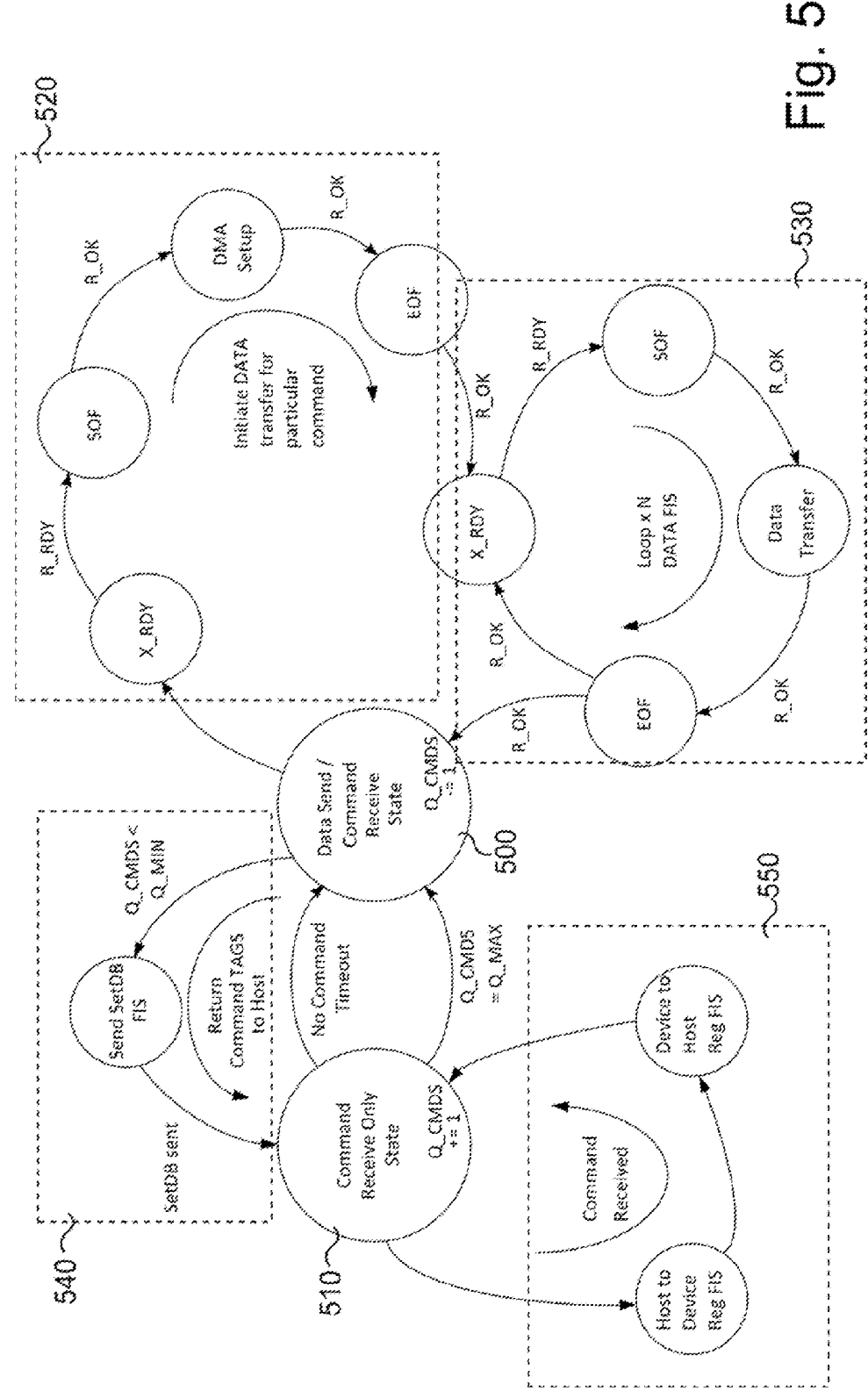
FIG. 5 is a flow chart representing state transition logic of a SATA device in accordance with aspects of the present invention.

FIG. 5 represents a method of operating a SATA device in accordance with an aspect of the invention described in terms of a state transition diagram of the device. The data state 500 is the operating state where the device has data to send but where commands are not acknowledged while there is still data to send. The device completes a cycle for each outstanding read command in the queue by issuing a DMA setup in 520 (by issuing X_RDY, the Start of Frame (SOF), a DMA setup FIS, and End Of Frame (EOF)), and then proceeding in a loop N times for each data transfer 530 before returning to the data state 500, decrementing the number of commands in the queue (Q_CMDS−=1) and repeating the process if there are still commands outstanding. However, in accordance with aspects of this invention, a test may be made to check to see if the number of commands in the queue has dropped below a minimum threshold (Q_CMDS<Q_MIN). If so, a Send SetDB FIS is returned to the host 540 which indicates in one frame the tags of all the read commands completed.

At this point, the SATA device enters the command receive state 510, where the device only receives commands. For each command, the host sends a Host to Device Register FIS and the device responds with Device to Host Register FIS as in block 550. The number of commands in the queue is incremented for each command received (Q_CMDS+=1). The SATA device then checks to see if the number of commands in the queue has reached the maximum (Q_CMDS=Q_MAX). If so, the device transitions back to the data state 500 where it now continues to process data transfers back to the host. In the event that the device is in the command receive state 510 but has not received a command within a specified period of time (a timeout period—in other words, the host has not yet filled the queue but has stopped sending commands for some other reason), it also transitions to the data state 500 to continue with data transfers.

In some situations, notably when the host uses a Linux®-based operating system, the maximum queue value for SATA NCQ (32 at present) is never reached as the operating system itself reserves one of the NCQ tags for its own internal purposes. In general, there could be other situations or reasons why a host may not use the full queue depth which is available on the SATA device. Therefore, the SATA device keeps a record of the highest value of Q_CMDS seen before a timeout occurs and can decide to modify the test (Q_CMDS is equal to Q_MAX) to (Q_CMDS is equal to Q_MAX_SEEN), where Q_MAX_SEEN is the actual maximum numbers of commands the device has seen before a timeout occurs.

In this way, the device can proceed immediately from the command receive state 510 to the data state 500 as soon as Q_MAX_SEEN is reached, without having to wait for a timeout to confirm that no further commands will be received, which will result in better bus utilization as otherwise the bus would be inactive while the command receive state 510 was waiting for the timeout to expire before transitioning to the data state 500. This enables the device to 'learn' the optimal maximum value of the received queue commands at which to transition from the command receive state 510 to the data state 500.

Alternatively, Q_MAX may be dynamically determined based on the reason for each transition between the command receive state 510 and the data state 500. According to an aspect of the invention, the SATA device may record whether the transition occurred due to a command timeout, or whether the maximum command threshold was reached. If the command timeout was reached, the maximum command threshold may be decremented. If the maximum command threshold was reached (and it is less that the device maximum of 32) then the maximum command threshold may be incremented.

The minimum queue value, Q_MIN, may be set based on the average read access latency of the SATA device and the average time for completion of a data transfer cycle. The value may be set such that the time to complete Q_MIN data transfer cycles is greater than the read access latency of the SATA device. This ensures that no time is spent with the bus inactive when the queue empties, as new data will then be available from the next command. In effect, the read access latency period is covered by bus activity while Q_MIN data transfer cycles take place. For a typical read access latency of 70 μs and a 4 KB data transfer time on a 6 Gbps serial bus of 7 μs, Q_MIN should preferably be at least 10.

While the invention has been described in terms of specific embodiments, it is apparent that other forms could be adopted by one skilled in the art. For example, the type of SATA device could differ from those described, and settings and processes other than those noted could be used. Therefore, the scope of the invention is to be limited only by the following claims.

The invention claimed is:

1. A Serial Advanced Technology Attachment (SATA) device for communicating with a host, the host sending commands to the SATA device and the SATA device sending data to the host in response to the commands being received by the SATA device, the SATA device having a queue of commands received from the host, wherein only one of either the commands from the host and the data from the SATA device is sent at a time, the SATA device comprising:
a first operating state wherein the commands are received by the SATA device and the data are not sent to the host; and
a second operating state wherein the commands are received by the SATA device and the data are sent to the host, wherein data being sent by the SATA device to the host has priority over commands being received by the SATA device from the host,
wherein, during the first operating state, the SATA device is configured to determine an occurrence of one or more conditions at which to transition from the first operating state to the second operating state, wherein at least one condition of the one or more conditions is based on if any commands are received by the SATA device.

2. The SATA device of claim 1, wherein in the second operating state if the SATA device has commands in the queue to which the SATA device is prepared to response by beginning a data phase in which the data are sent to the host then the SATA device starts the data phase, and if the SATA device does not have commands in the queue to which the SATA device is prepared to respond or the SATA device is otherwise busy then the host sends commands to the SATA device.

3. The SATA device of claim 1, wherein the SATA device is configured to transition from the second operating state to the first operating state if a total number of commands in the queue of the SATA device reaches a minimum threshold.

4. The SATA device of claim 3, wherein the minimum threshold is a value that is large enough such that the time to complete a number of data transfer cycles equal to the value is greater than a read access latency of the SATA device.

5. The SATA device of claim 1, wherein the occurrence of the one or more conditions corresponds to when a total number of commands in the queue of the SATA device reaches a maximum threshold.

6. The SATA device of claim 5, wherein the maximum threshold is a largest number of commands that the SATA device can hold in the queue.

7. The SATA device of claim 1, wherein the occurrence of the one or more conditions corresponds to when a timeout period is reached wherein the SATA device has not received a command within a predetermined period of time.

8. The SATA device of claim 7, wherein the occurrence of the one or more conditions further corresponds to when a total number of commands in the queue of the SATA device reaches a maximum seen threshold, the maximum seen threshold being a highest number of commands seen in the queue before the timeout period is reached.

9. The SATA device of claim 1, wherein the occurrence of the one or more conditions corresponds to when a total number of commands in the queue of the SATA device reaches a maximum threshold, and a timeout period is reached wherein the SATA device has not received a command within a predetermined period of time.

10. The SATA device of claim 9, wherein the SATA device records whether a transition occurred due to a timeout period being reached, or due to the maximum threshold being reached, if the timeout period was reached, then the maximum threshold is decremented, and if the maximum threshold was reached and the maximum threshold is less than a largest number of commands that the SATA device can hold in the queue, then the maximum threshold is incremented.

11. The SATA device of claim 9, wherein the occurrence of the one or more conditions further corresponds to when a total number of commands in the queue of the SATA device reaches a maximum seen threshold, the maximum seen threshold being the highest number of commands seen in the queue before the timeout period is reached.

12. A method of managing communication between a host and a SATA device, the method comprising:
sending commands from the host to the SATA device while the SATA device is operating in a first operating state, the commands received by the SATA device being stored in a queue in the SATA device;
transitioning the SATA device from the first operating state to a second operating state;
sending data from the SATA device to the host in response to the commands stored in the queue while the SATA device in the second operating state; and
sending commands from the host to the SATA device if the SATA device does not have commands in the queue to which the SATA device is prepared to respond or the SATA device is otherwise busy while the SATA device is operating in the second operating state; and
in the first operating state, determining an occurrence of one or more conditions at which to transition from the first operating state to the second operating state, wherein at least one condition of the one or more conditions is based on if any commands are received by the SATA device,
wherein data are not sent from the SATA device to the host while the SATA device is operating in the first operating state.

13. The method of claim 12, further comprising transitioning the SATA device from the second operating state to the first operating state when a total number of commands in the queue of the SATA device reaches a minimum threshold.

14. The method of claim 12, wherein the occurrence of the one or more conditions corresponds to when a total number of commands in the queue of the SATA device reaches a maximum threshold.

15. The method of claim 12, wherein the occurrence of the one or more conditions corresponds to when a timeout period is reached wherein the SATA device has not received a command within a predetermined period of time.

16. The method of claim 15, wherein the occurrence of the one or more conditions further corresponds to when a total number of commands in the queue of the SATA device reaches a maximum seen threshold, the maximum seen threshold being the highest number of commands seen in the queue before the timeout period is reached.

17. The method of claim 12, wherein the occurrence of the one or more conditions corresponds to when a total number of commands in the queue of the SATA device reaches a maximum threshold, and a timeout period is reached wherein the SATA device has not received a command within a predetermined period of time.

18. The method of claim 17, further comprising recording whether transitioning the SATA device from the first operating state to the second operating state is performed due to a timeout period being reached or due to the maximum threshold being reached, wherein if the timeout period was reached, then the maximum threshold is decremented, and if the maximum threshold was reached and the maximum threshold is less than a largest number of commands that the SATA device can hold in the queue, then the maximum threshold is incremented.

19. The method of claim 17, wherein the occurrence of the one or more conditions further corresponds to when a total number of commands in the queue of the SATA device reaches a maximum seen threshold, the maximum seen threshold being the highest number of commands seen in the queue before the timeout period is reached.

20. The SATA device of claim 12.

\* \* \* \* \*